US008746317B2

(12) United States Patent
Barbetti et al.

(10) Patent No.: US 8,746,317 B2
(45) Date of Patent: Jun. 10, 2014

(54) WORKING TOOL ORIENTING DEVICE IN TIRE DEMOUNTING MACHINE

(76) Inventors: Mauro Barbetti, Correggio (IT);
Michele Barbetti, Correggio (IT);
Gianfranco Pellacani, Correggio (IT);
Roberto Iotti, Correggio (IT)

( * ) Notice: Subject to any disclaimer, the term of this patent is extended or adjusted under 35 U.S.C. 154(b) by 306 days.

(21) Appl. No.: 13/287,887

(22) Filed: Nov. 2, 2011

(65) Prior Publication Data
US 2012/0061028 A1 Mar. 15, 2012

(30) Foreign Application Priority Data

Nov. 2, 2010 (IT) .............................. MO2010A0305

(51) Int. Cl.
*B60C 25/138* (2006.01)
(52) U.S. Cl.
USPC ........................................ 157/1.17; 157/1.24
(58) Field of Classification Search
USPC ................................... 81/1.17, 1.24–1.28, 14
See application file for complete search history.

(56) References Cited

U.S. PATENT DOCUMENTS

| 4,209,053 | A | * | 6/1980 | du Quesne | 157/1.24 |
|---|---|---|---|---|---|
| 4,210,190 | A | * | 7/1980 | Hessels | 157/1.24 |
| 5,325,903 | A | | 7/1994 | Du Quesne | |
| 6,056,034 | A | * | 5/2000 | Matnick | 157/1.24 |
| 6,276,423 | B1 | * | 8/2001 | Goracy | 157/1.17 |
| 6,588,478 | B2 | * | 7/2003 | Vignoli | 157/1.28 |
| 2007/0158033 | A1 | | 7/2007 | Cunningham | |
| 2008/0163983 | A1 | * | 7/2008 | Cunningham | 157/1.24 |

FOREIGN PATENT DOCUMENTS

| DE | 9101930 | 6/1991 |
|---|---|---|
| EP | 1897710 | 3/2008 |
| EP | 2269841 | 1/2011 |

* cited by examiner

*Primary Examiner* — Hadi Shakeri
(74) *Attorney, Agent, or Firm* — Themis Law (57) ABSTRACT

A working tool orienting device in a tire demounting machine includes a base which supports a rotary apparatus, rotating about an axis of rotation and designed to bear and lock wheel rims thereon; a column rising from the base and having an end secured to the base and an end opposite thereto facing upward; a moving arm, which is moved between positions close to and away from the rotary apparatus; a support arrangement for supporting working tools, which is coupled with the upward facing end, and joint means interposed between the support arrangement and the upward facing end, which are configured to make the support arrangement movable relative to the arm.

10 Claims, 7 Drawing Sheets

WORKING TOOL ORIENTING DEVICE IN TIRE DEMOUNTING MACHINE

FIELD OF THE INVENTION

The invention relates to a working tool orienting device in a tire demounting machine. More particularly, the invention relates to a device that provides for a desired orientation of a working tool for mounting tires to vehicle wheel rims, regardless of wheel diameter.

BACKGROUND ART

Tire demounting machines are known to be equipped with a support arrangement for working tools, which are interchangeable according to the operations to be performed on vehicle wheel tires by tire repairers.

The support arrangement is mounted at the free end of an operating arm, which is hinged to a column that is part of the tire demounting machine, and rises upwards from a base designed to hold the motion imparting members of the tire mounting machine therein.

The operating arm may pivot in cantilever fashion in a plane of rotation parallel to the support surface of a wheel supporting unit which is mounted to the base and is known as a "self-centering unit".

The support arrangement is integral with the end to which it is mounted and hence follows its rotary motion in a rigid manner, and changes its orientation relative to the "self-centering unit" when the operating arm is rotated through the various work positions.

The rotation angle of the arm typically changes with wheel diameters, and hence with tire diameters, whereby the working tools assume different work positions relative to the tires, according to the diameters of the latter, and only take substantially correct positions at certain diameters, typically intermediate diameters, whereas the work positions of the working tools at smaller or greater diameters are considerably deviated from the desired position, namely in directions converging towards the center relative to tire profiles, as tire diameters increase.

Particularly, for tire mounting and demounting, tire repairers use a tool that comprises a shank attached to the support arrangement and a first operating part designed to facilitate mounting of tires to rims, which has a substantially tapered profile with an end apex, and a second operating part designed to facilitate demounting of tires from rims, which has a positioning member projecting towards the self-centering unit and designed to contact one point of the rim edge and which is opposite to the first operating part on the tool.

Typically, to mount and demount tires to and from rims, tire repairers first lock the wheels on the self-centering unit and then maneuver the operating arm to lie the positioning element on the rim edge, while moving the working tool closer to the upper surface of the wheel locked on the self-centering unit whereupon they use a lever to cause first the upper bead of the tire, i.e. the one facing upwards, and then the lower bead, to pass over the demounting bead of the tool.

Each time that a bead passes over the tool, the self-centering unit is rotated about its axis of rotation and the tire is removed from its rim in two operating steps.

Likewise, to mount a tire to a wheel rim that has been previously locked on the self-centering unit, tire repairers first manually introduce a first lower bead into the central channel of the rim, and then maneuver the operating arm to place to tool close to the rim edge and to dispose the positioning element on the support arrangement.

Next, the repairers dispose a portion of the upper bead, which has not been introduced yet, on the mounting part of the working tool and use a lever to force a portion adjacent to the one lying on the mounting part underneath the edge of the rim, towards the central channel thereof, and rotate the self-centering unit.

Thus, the upper bead is progressively guided by the mounting part which elastically bends it as it runs thereunder, and is thereby forced to pass over the upper edge of the rim throughout the diameter of the bead towards the central channel.

Particularly, as viewed from above, the profile of the mounting part of a known tool for mounting and demounting tires to and from wheel rims, has an end with a tapered profile with an end tip which, at the start of each mounting step, is designed to wedge between the lifted bead of the tire and the rim edge to assist the bead to follow an inclined guide surface formed in the tool as an extension of the tip, according to the direction of rotation of the self-centering unit.

This surface has such a shape as to guide the bead which, due to the rotation of the self-centering unit, slides thereon, and to force it to pass over the rim edge, thereby introducing it into the central channel of the rim, as mentioned above.

This prior art has a drawback typically consisting in that the support arrangements are mounted to their respective ends of the support arms in a fixed manner, as mentioned above, which causes the orientation of the parts for mounting and demounting tires on rims to change according to wheel diameters, thereby progressively increasing the difficulty of the operations as the orientation of the working tool deviates from the best operating position, due to too large or too small displacements of the operating arm.

More in detail, the tip of the mounting part progressively moves away from the inner profile line of a tire bead when the latter, as mentioned above, has a very small or a very large diameter.

As distance between the tip and the bead profile line increases, the steps of lifting the bead and introducing the tip between the bead and the rim edge become increasingly difficult, because the bead profile has to be deformed to a greater extent in the portion of the tire sidewall where mounting beings, to lay the bead on the part of the tool that is designed therefor.

Such step is both laborious and poorly stable because, due to the elasticity and high stiffness of the beads of certain types of tires, the excessive deformation created by the tire repairer on the bead using the lever tends to cause the bead to slip off the working tool, thereby making it useless, and forcing the tire repairer to repeat the lifting step possibly several times to mount a tire to a rim, using the tire demounting machine.

SUMMARY OF THE INVENTION

One object of the present invention is to improve the state of the art.

Another object of the invention is to provide a working tool orienting device in a tire demounting machine, which allows optimal working tool orientation to be maintained regardless of wheel diameters.

In one aspect the invention relates to a working tool orienting device in a tire demounting machine as described herein.

Therefore, the invention allows a working tool alignment plane in a tire demounting machine to be maintained in proper alignment regardless of the diameters of the wheels subjected to tire mounting or demounting.

BRIEF DESCRIPTION OF THE DRAWINGS

Further characteristics and advantages of the invention will be more apparent from the detailed description of one preferred, non-exclusive embodiment of a working tool orienting device in a tire demounting machine, which is illustrated by way of non-limiting example in the annexed drawings, in which.

DETAILED DESCRIPTION OF A PREFERRED EMBODIMENT

Figure 1:
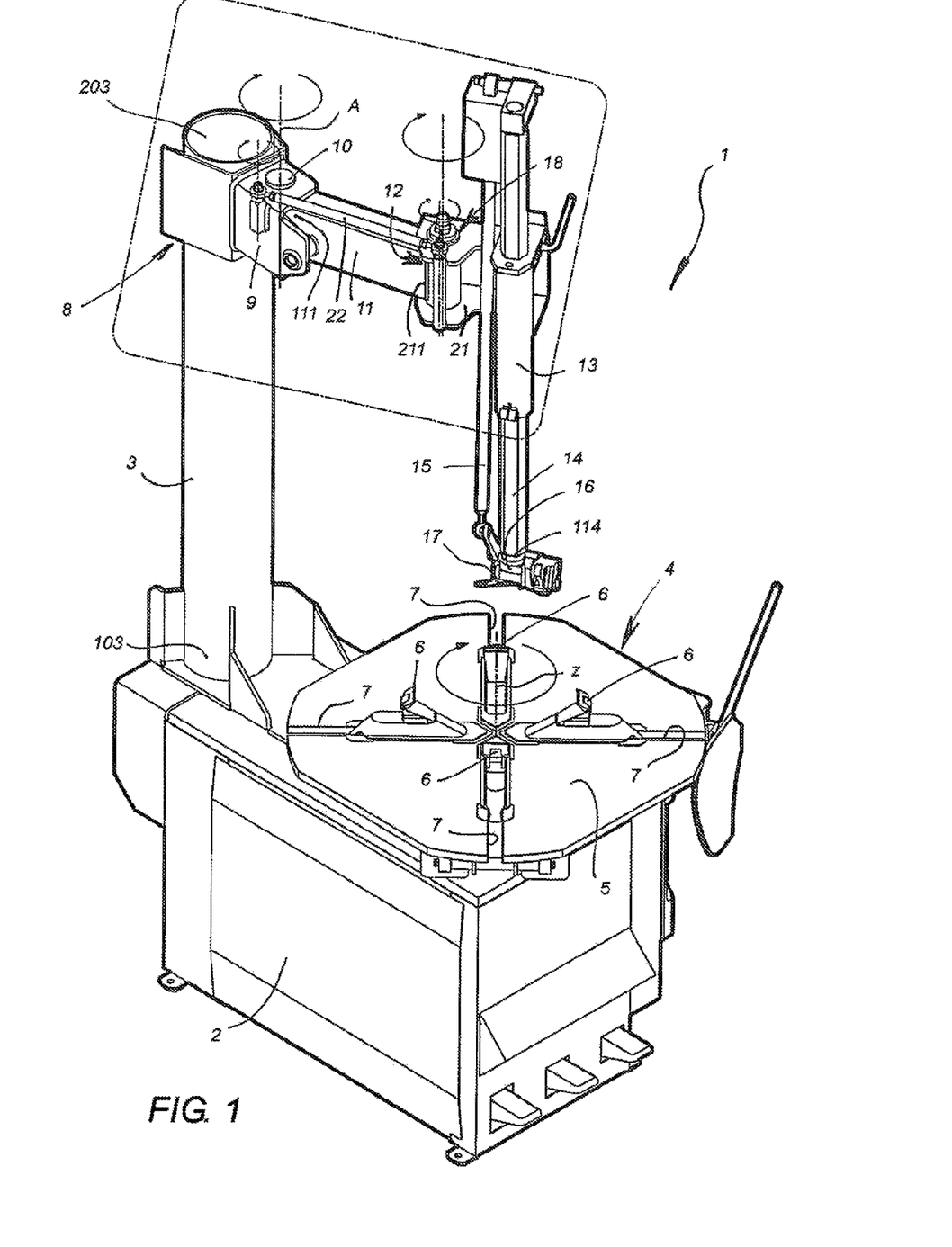
FIG. 1 is a perspective view of a tire demounting machine equipped with a working tool orienting device in a tire demounting machine of the invention.

Referring to FIG. 1, numeral 1 generally designates a tire demounting machine which comprises a base 2 having a substantially vertical column 3 extending upwards therefrom, and supporting a rotary apparatus 4, known and referred to hereinafter as "self-centering unit", which rotates about an axis "Z" and upon which vehicle wheels are usually laid and locked for performing operations on tires, such as tire demounting and mounting.

More in detail, the self-centering unit 4 is shown to comprise a platform 5 with wheel rim edge gripping jaws 6 mounted thereon, which are arranged in crossed pairs and are capable of synchronized converging-diverging motion relative to the center, along perpendicular tracks.

The column 3 has a lower end 103 secured to the base 2 and an opposite upper end 203 facing upwards.

A fastening element 8 is mounted at the upper end 203, and forms a bracket 9 having a hinge 10 with a vertical axis of rotation "A" for hinging a concurrent end 111 of an arm 11 which has joint means 12 at the opposite end 211, which means support a sleeve 13 substantially parallel to the axis of rotation "A".

A rod 14 having a polygonal, e.g. hexagonal cross section is slideably inserted within the sleeve 13, and couples with the hollow polygonal section of the sleeve 13, which prevents rotation thereof about its longitudinal axis.

The rod 14 slides in the sleeve 13 by means of a fluid-dynamic actuator, typically a pneumatic cylinder, not shown, or manually, against the action of elastic members which operate between the rod 14 and the sleeve 13 and normally tend to push the rod 14 away from the self-centering unit 4.

Figure 2:
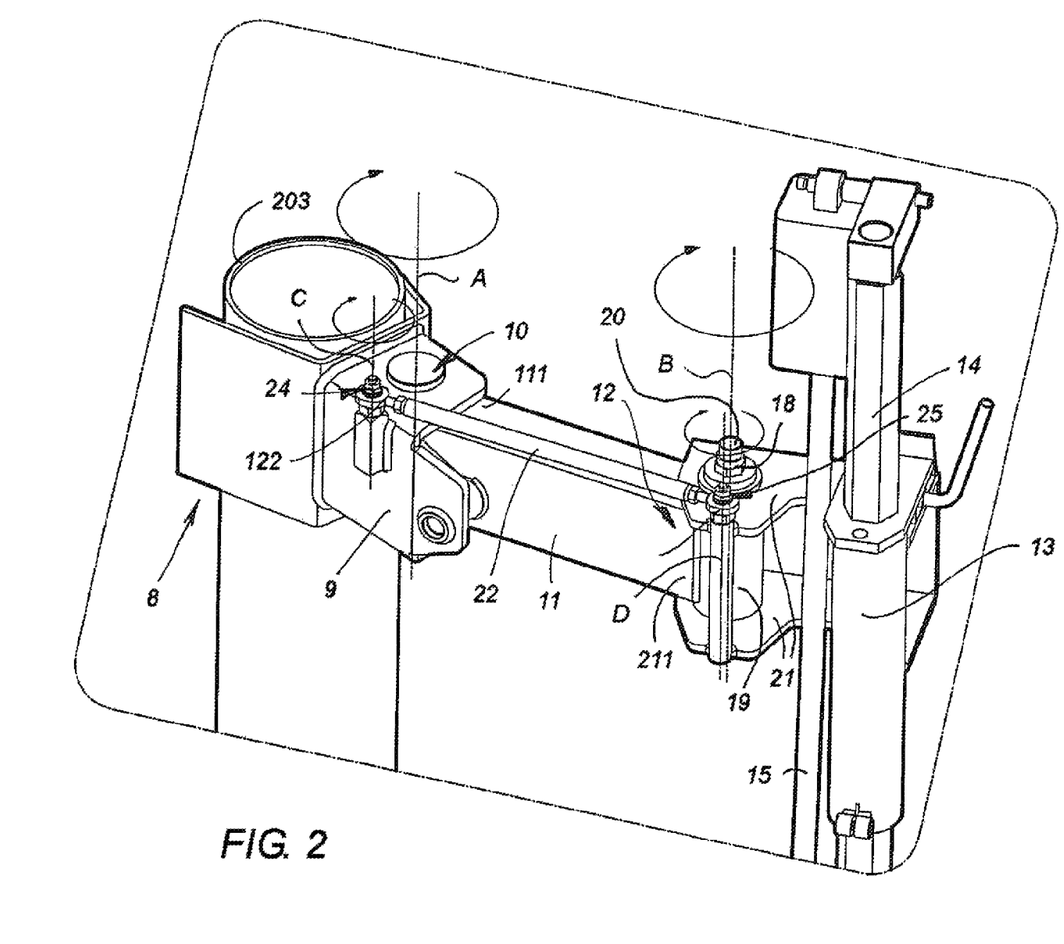
FIG. 2 is a broken detailed view of a detail of the tire demounting machine of FIG. 1.

Referring to FIG. 2, the joint means 12 are shown to include a second hinge 18 having an axis of rotation "B" parallel to the axis of rotation "A" of the hinge 10.

The hinge 18 comprises a sleeve 19 that is integral with the end 211 of the arm 11 and receives a hinge pin 20 whose longitudinal axis coincides with the axis "B".

The hinge pin 20 extends through two flanges 21 which combine with the hinge 18 to form the joint means 12.

The flanges 21 support the sleeve 13 which can thus rotate about the hinge axis "B" relative to the arm 11.

A connecting stem 22 is interposed between the flanges 9 and 21, and has a predetermined length, with its ends 122 and 222 hinged to respective flanges.

Typically, the connecting stem 22 acts as a tie rod, causing the flanges 21 to automatically rotate about the hinge axis "B" when the arm 11 rotates relative to the flange 9, about the hinge axis "A".

The ends 122 and 222 are formed in a ring shape and are hinged to corresponding hinges 24 and 25, which are fixed to the flange 9 and the flanges 21 with their respective hinge axes "C" and "D" parallel to each other and to the hinge axes "A" and "B".

Figure 3:
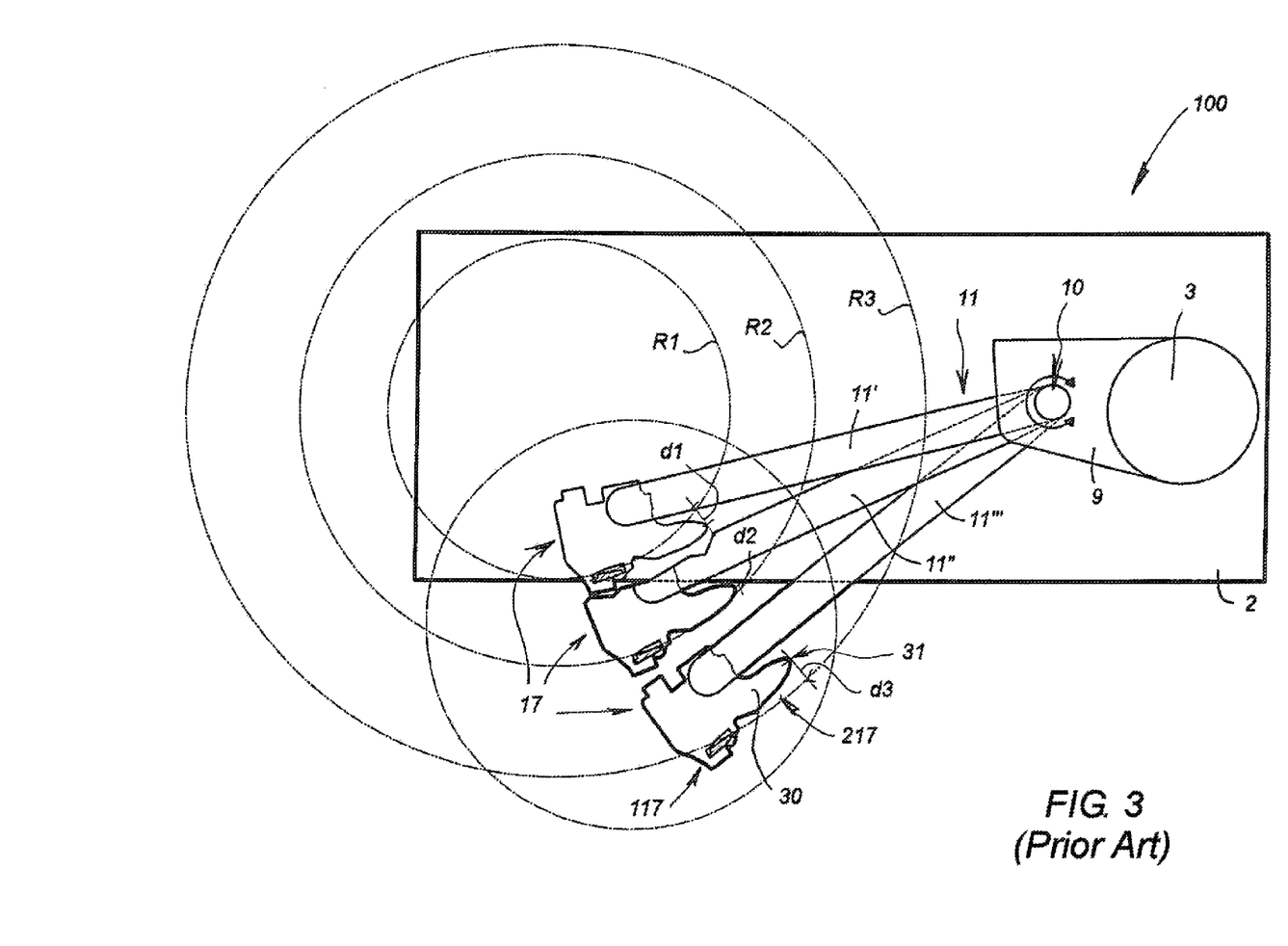
FIG. 3 is a very schematic top view of a working tool orienting device in a tire demounting machine of the prior art.

Referring to FIG. 3, a prior art tire demounting machine, generally referenced 100, is shown in a very schematic top view, and comprises the base 2, the column 3 and the arm 11, which is hinged to the column 3 by the hinge 10 and is adapted to move in cantilever fashion.

The broken lines "R1", "R2", "R3" designate three outside diameters of rims placed on the rotary apparatus 4 equipping the tire demounting machine 100, but not shown in FIG. 3.

Once again, the numeral 17 designates a working tool mounted to the arm 11 by means of the fastening members 16.

This tool 17 is particularly used to mount or demount tires to and from wheel rims, and has a plan shape whose perimeter defines a demounting part, referenced 117 and a mounting part, referenced 217.

As shown in FIG. 3, the mounting part, which is used to assist tire repairers in mounting tires to respective wheel rims, comprises a claw 30 having a pointed profile and an end apex 31.

This apex 31 has the well-known purpose of wedging between the outer edge of a rim and the bead of a tire to be mounted to the rim, as shown by the lines "R1", "R2", "R3", corresponding to three possible exemplary diameters, to assist insertion of the claw 30 and lifting of the bead thereby.

As shown in FIG. 3, by changing the rotation of the arm 11 through the positions 11', 11", 11'", the distance of the apex 31 from the corresponding bead profile line also changes.

It will be particularly appreciated that, with a large diameter, as defined by the broken line "R3", the working tool 17 can be only used if the arm 11 is rotated to the position 11'", whereby the apex 31 will automatically reach a distance "d3" which is inward of the line "R3" relative to the center thereof.

With an intermediate diameter, as defined by the line "R2" the working tool can be moved closer to the tire bead by rotating the arm 11 to the position 11", and in this position the apex 31 will be substantially at a distance "d2" from the line "R2" which is considerably smaller than the distance "d3" from the line "R3", whereby the apex 31 will be almost coincident with the line "R2".

When the tire has a small diameter and the tire is defined by the line "R1", the arm 11 has to be rotated to the position 11', where the apex 31 is again at a considerable distance from the line "R1", as indicated by "d1", in this case outward of the line "R1".

In order to mount a tire to a rim, a tire repairer has to manually lay a portion of the tire bead on the claw 30, namely on the mounting part 217 of the working tool 17, and force a bead portion adjacent thereto underneath the rim edge, using a lever, and then rotate the rotary apparatus 4 and push the entire circumference of the bead into the rim.

In the positions 11'" and 11' of the arm, the step of lifting the bead portion and laying it over the mounting part 217 is quite laborious and unstable, due to the excessive distances "d3" and "d1" of the apex 31 from the lines "R3" and "R1", whereas this step is considerably easier and provides greater stability in the position 11" relative to the line "R2", because the apex 31 is very close to the line "R2" and almost coincides therewith.

Figure 4:
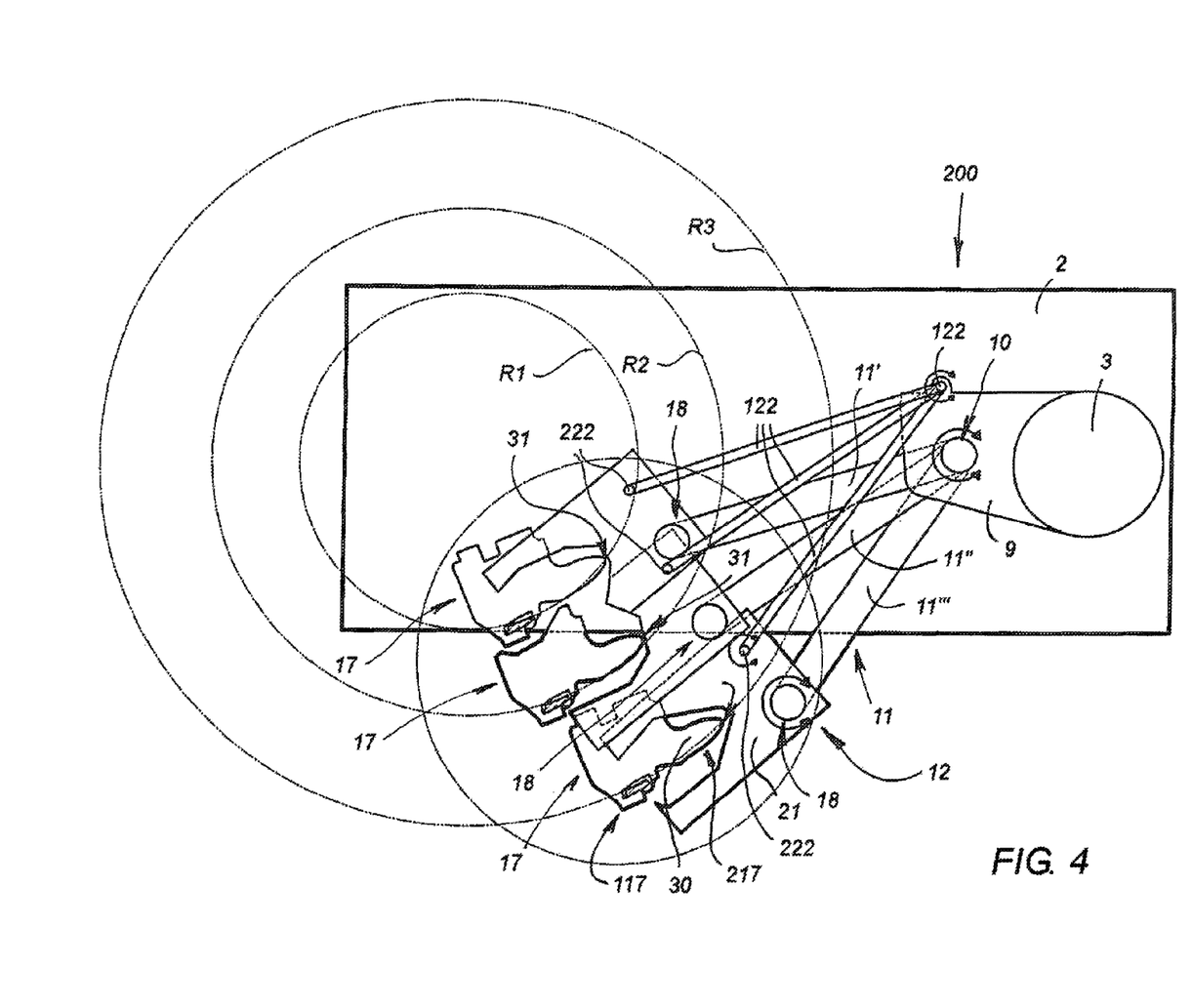
FIG. 4 is a very schematic top view of a working tool orienting device in a tire demounting machine of the invention, in a possible embodiment.

Referring to FIG. 4, a tire demounting machine, referenced 200, is shown in a top view, and has the orientation device for the working tool 17 of the invention mounted thereto.

For clarity, FIG. 4 also shows the lines "R1", "R2", "R3" indicating the three inner tire bead profiles having three different diameters and the positions 11', 11", 11''' of the arm 11 to move the working tool 17 to the lifting portions of the tire beads in the three lines or diameters "R1", "R2", "R3".

As shown in this figure, the position of the apex 31 in the three positions of the arm 11 does not change appreciably through the lines "R1", "R2", "R3", and is maintained substantially coincident therewith, in spite of the rotation of the arm 11.

Typically, the stem 22 forces the joint means 12 to automatically rotate at the same time as the arm 11, thereby maintaining the working tool 17 in a substantially constant orientation relative to the lines "R1, "R2", "R3" which actually define, as mentioned above, the inside diameters of the tire beads having different diameters, and maintaining the apex 31 in a substantially constant position relative to the beads, so that its distance does not change in response to diameter changes.

In other words, the combined action of the stem 22 and the joint means 12 compensates for the rotation of the arm 11, and changes the position of the flanges 21, and hence of the working tool 17, in response to changes of the diameters of tire beads to be mounted to rims, to maintain the apex 31 as close as possible to the inner profiles of the beads.

Figure 5:
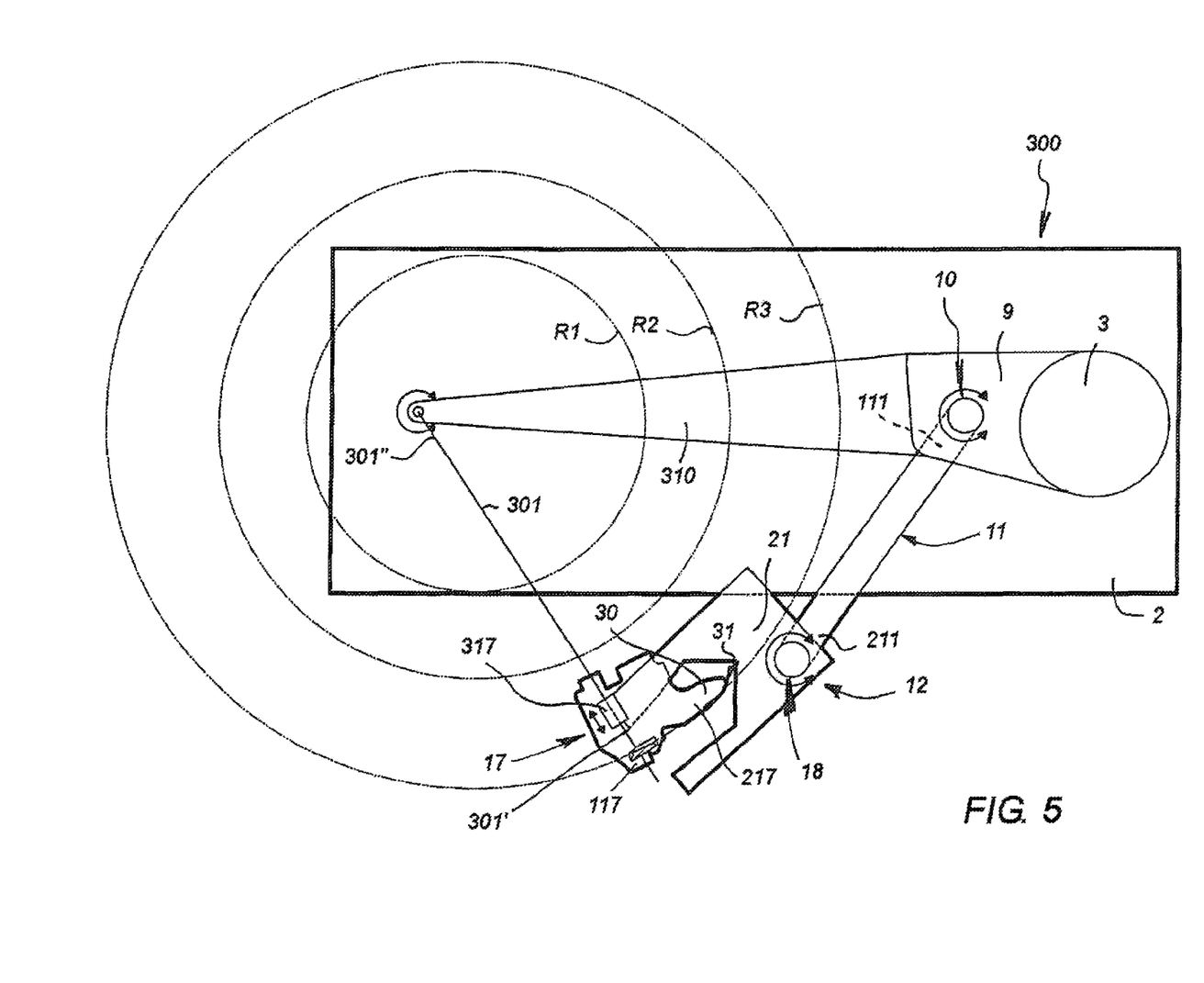
FIG. 5 is a very schematic top view of a working tool orienting device in a tire demounting machine of the invention, in a second possible embodiment, alternative to the one as shown in FIG. 4.
Figure 6:
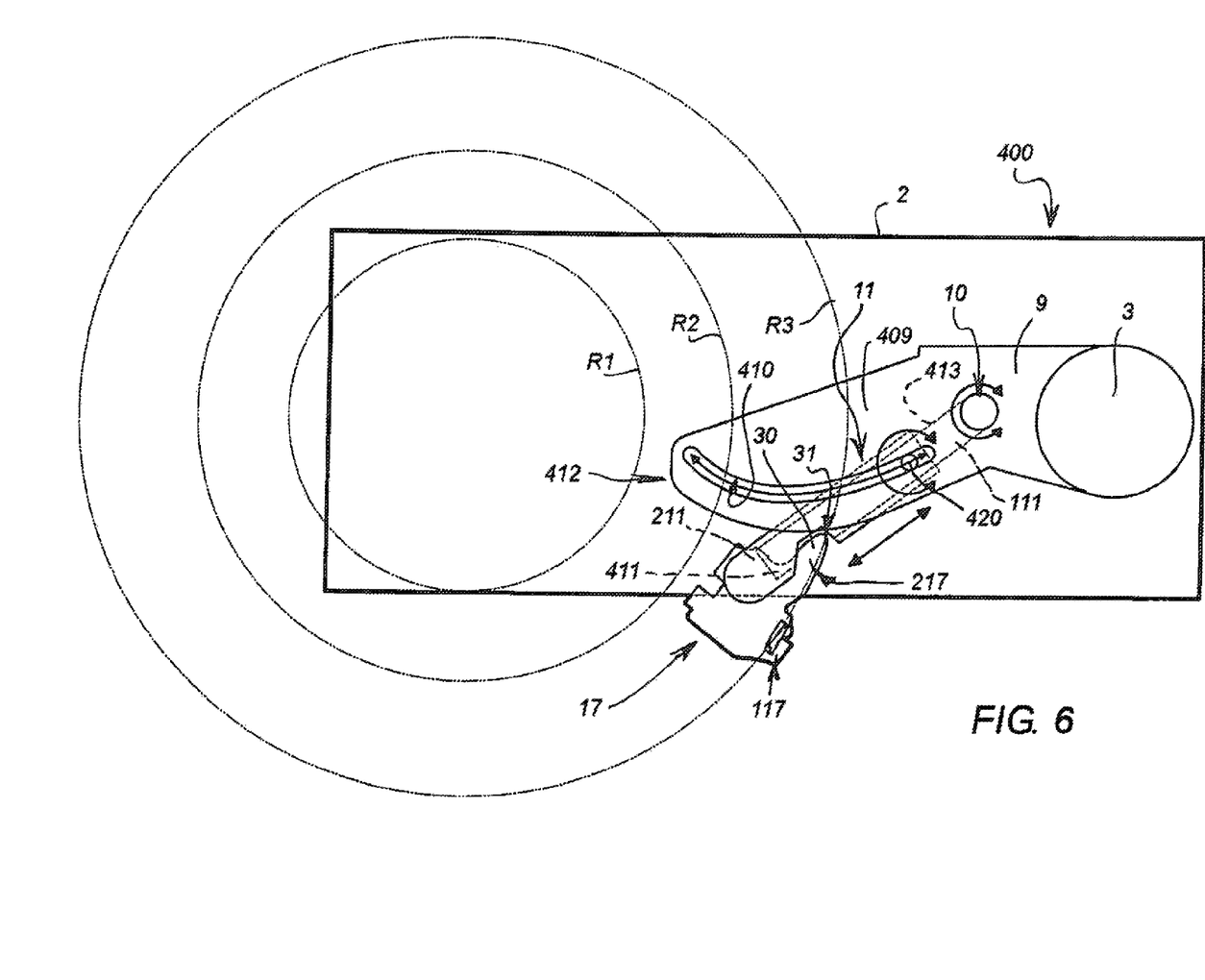
FIG. 6 is a very schematic top view of a working tool orienting device in a tire demounting machine of the invention, in a third possible embodiment, alternative to the ones as shown in FIGS. 4 and 5.
Figure 7:
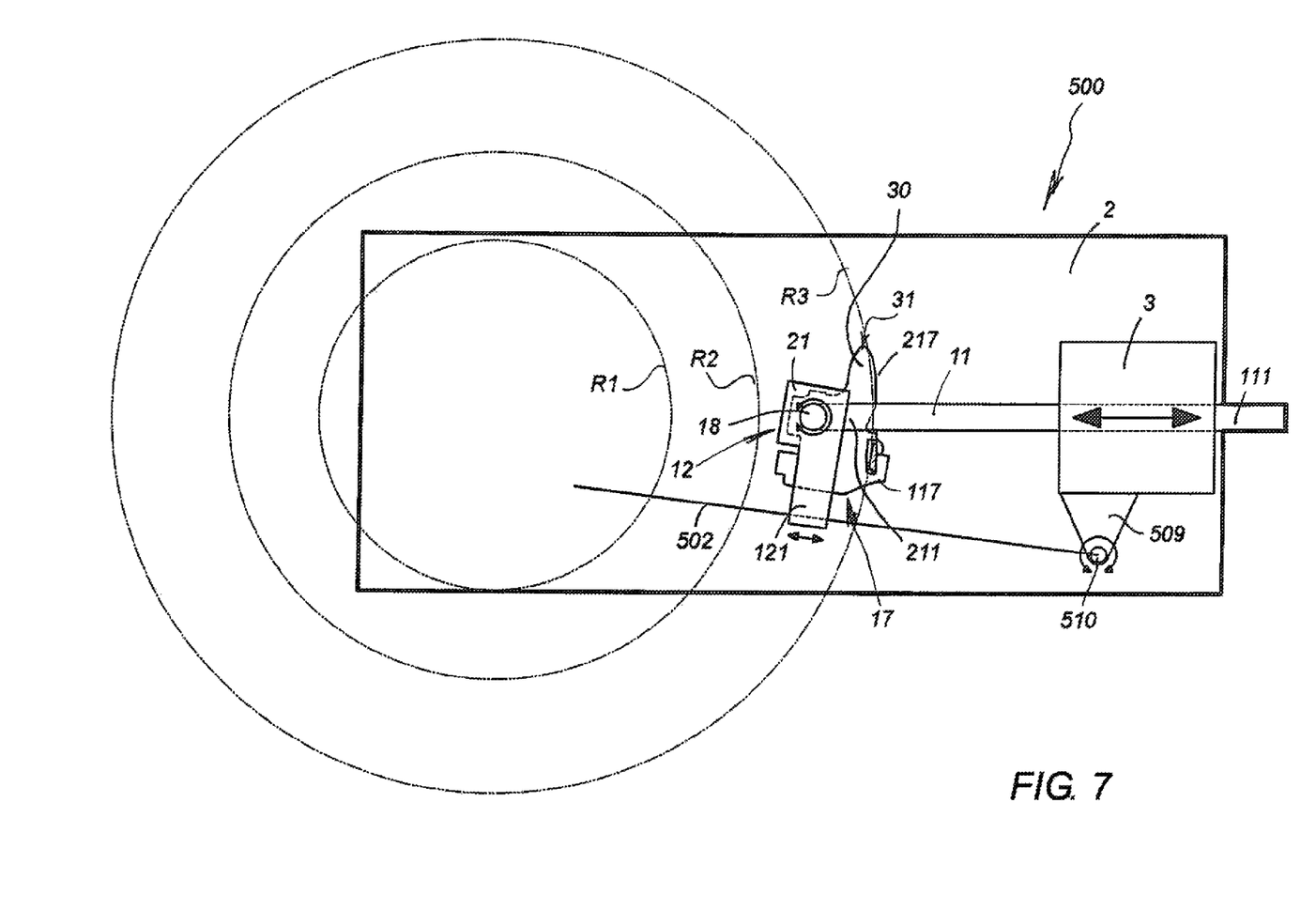
FIG. 7 is a very schematic top view of a working tool orienting device in a tire demounting machine of the invention, in a fourth possible embodiment, alternative to the ones as shown in FIGS. 4, 5, 6.

Referring to FIGS. 5, 6, 7, there are shown three different possible alternative embodiments of the orientation device of the invention, which can all automatically change the orientation of the working tool 17 through the different positions of the arm 11.

Particularly, referring to FIG. 5, a tire demounting machine is schematically shown, which comprises the base 2, the column 3, the arm 11.

A flange 9 is interposed between the latter and the column 3 and has a hinge 10 for hinging the end 111 of the arm, whereas joint means 12 are provided at the end 211, i.e. the hinge 18 and the flanges 21.

In this embodiment, the tool 17 has a sleeve 317 with a longitudinal axis substantially oriented towards the center of the lines or diameters "R1", "R2", "R3", which slideably receives the free end 301' of a rod 301.

Such rod 301 has the opposite end 301" hinged to a concurrent end of a second stationary arm 310 extending integrally with the flange 9 towards the center area of the lines "R1", "R2", "R3".

Referring to FIG. 6, a tire demounting machine 400 is shown in a further schematic top view, and comprises the base 2, the column 3 and the arm 11 which in this case is of telescopic type, and hence capable of changing its length, by being composed of at least two parts, i.e. a stationary part 413 and a sliding part 411, moving over the stationary part 413.

The joint means, here referenced 412, comprise a fixed extension of the flange 9, designated 409, having a sufficient area for a curved slot to be formed therein.

A pin 420 is engaged and slideably guided in the slot 410, and overhangingly projects from the arm 11, namely from the movable part 411 thereof.

As the arm 11 is rotated to come close to one of the beads "R1", "R2", "R3", the pin 420 slides in the slot 410 and causes changes in both the length of the arm 11 and simultaneously the orientation of the working tool 17, for the apex 31 to be maintained substantially coincident with the bead profile.

Referring to FIG. 7, a tire demounting machine, referenced 500, is shown which comprises the base 2 with the column 3 extending upwards therefrom and supporting the arm 11, which in this case is not hinged to the column 11 but slides transverse thereto towards or away from the rotary apparatus 4, not shown, within a prismatic seat transversely formed in the column 3.

The arm 11 supports at its free end 211 the joint means 12, here also comprising the flanges 21 and the hinge 18, the latter allowing the flanges to rotate relative to the arm 11 and to also rotate the working tool 17.

The flanges 21 also comprise a sleeve 121 that slideably receives a rod 502 having one end 503 hinged to the column 3 by means of a hinge 510 that is supported by a flange 509 transversely extending in stationary fashion from the column 3.

As the arm 11 is caused to slide to move the working tool 17 closer to any one of the bead diameters "R1", "R2", "R3", in the lifting position, the coupling between the rod 502 and the sleeve 121 forces the flanges 21 to progressively rotate about the hinge 18, thereby automatically correcting the position of the working tool 18 for the apex 31 to be constantly substantially coincident with the beads "R1", "R2", "R3".

The operation of the orienting device of the invention is described below for each embodiment thereof.

Referring to the embodiment of FIGS. 1, 2, 4, it will be appreciated that, as a tire repairer rotates the arm 11 to the merely exemplary positions 11', 11", 11''' to move the working tool 17 close to one of the diameters or lines "R1", R2", "R3", the stem 22, having one end 122 hinged to a fixed point of the column 3 and the other end hinged to the flanges 21, causes the latter to automatically rotate according to the rotation of the arm 11.

This allows the claw 30 and the apex 31 of the working tool 17 to be maintained in a substantially constant orientation relative to the diameters "R1", R2", "R3", for the apex to be always close to them with no appreciable deviation.

This result is shown in FIG. 4.

Referring to the embodiment of FIG. 5, it can be appreciated that, in the tire demounting machine 300, as the arm 11 is rotated by the tire repairer to move the mounting part 217 of the working tool 17 close to one of the diameters "R1", R2", "R3", the sliding engagement of the sleeve 317 and the end 301' of the rod 301 progressively changes the position of the working tool 17, and hence the claw 30 and the apex 31 thereof, according to the rotation of the arm 11, thereby maintaining, once again, its orientation substantially constant relative to the diameters "R1", R2", "R3".

Referring to the embodiment as shown in FIG. 6, it will be appreciated that, in the tire demounting machine 400, as the tire repairer rotates the arm 11 to move the mounting part 217 of the working tool 17 close to one of the diameters "R1", R2", "R3", the pin 420 slides in the curved slot 410 thereby changing the length of the arm 11, i.e. causing the sliding part 411 to slide over the stationary part 413.

At the same time, the curved path of the slot 410 forces the working tool 17 to a composite rotational and translational movement, thereby maintaining the claw 30 and the apex 31, once again, in a substantially constant orientation relative to the diameters "R1", R2", "R3".

Referring to the embodiment of FIG. 7, it can be appreciated that, in the tire demounting machine 500, as the tire repairer causes the arm 11 to slide within the column 3 to move the working tool 17 close to one of the diameters "R1", "R2", "R3", the working tool 17, and hence the claw 30 and the apex 31 are maintained in substantially constant orientations relative to the diameters "R1", "R2", "R3", due to the sliding engagement of the sleeve 121 and the rod 502, which forces the flanges 21 to progressively rotate about the hinge, as the arm 11 comes close to smaller diameters or moves away from them, and retracts towards the column.

The invention was found to fulfill the intended objects.

The invention so conceived is susceptible to a number of changes and variants within the inventive concept.

Furthermore, all the details may be replaced by other technically equivalent parts.

In practice, any materials, shapes and sizes may be used as needed, without departure from the scope of the following claims.

The invention claimed is:

1. A working-tool (17) orienting device in a tire demounting machine (1) comprising:
    a base (2) supporting a rotatable apparatus (4) around a rotation axis (Z), the base being configured to rest and block thereon (R1, R2, R3) of wheels of vehicles;
    a column (3) extending from said base (2) and having one fastening end (103) to said base and one opposite end (203) facing upward, a column longitudinal axis being defined between said fastening end and said opposite end;
    one arm (11) transversally supported on said opposite end (203) of said column (3), the arm being movable at a distal (211) end from said column (3), with respect to said rotatable apparatus (4), between a working position and a resting position;
    a supporting arrangement (13, 14, 16) of said working-tool (17) associated to said distal end (211);
    a joining system (12; 18, 21; 412) interposed between said supporting arrangement (13, 14, 16) and said distal end (211), the joining system (12; 18, 21; 412) being configured to make said supporting arrangement (13, 14, 16) movable with respect to said arm (11); and
    a connecting member (22; 301, 310, 317, 121, 502, 509, 510) interposed between said joining system (12) and said column (3) and movable together with said arm (11), the connecting member being configured to make said joining system (12) rotate with respect of said arm (11), such to maintain said working-tool (17) substantially constantly oriented in said working position with respect of said rims (R1, R2, R3) during rotation movements of said arm (11) with respect of said column (3).

2. The device according to claim 1, wherein said supporting arrangement (13, 14, 16) is rotatably joined in a rotation plane which is substantially perpendicular to said rotation axis (Z) of said rotatable apparatus (4).

3. The device according to claim 1, wherein said arm (11) is movable by action of a first hinge (10) defining a first rotation axis (A) substantially parallel to said rotation axis (Z) of said rotatable apparatus (4).

4. The device according to claim 1, wherein said arm (11) is movable by action of a sliding seat transversally obtained in said opposite end (203) of said column (3) in which said arm (11) is slidably engaged to move toward or away from said rotatable apparatus (4).

5. The device according to claim 1, wherein said joining system comprises a hinge (18) defining a second rotation axis (B) parallel to said rotation axis (Z) of said rotatable apparatus (4).

6. The device according to claim 5, wherein said joining system (12) further comprises a support flange (21) associated to said hinge (18) and supporting said supporting arrangement (13, 14, 16) of said working-tool (17), such to be rotatable with respect to said arm (11).

7. The device according to claim 5, wherein said hinge (18) comprises:
    a flange (21) integral with said supporting arrangement (13, 14, 16);
    a sleeve (19) integral with said distal end (211) and having a longitudinal axis coinciding with said second rotation axis (B); and
    a rotation pin (20) rotatably and coaxially placed in said sleeve (19), the rotation pin having its ends integral with said flange.

8. The device according to claim 1, wherein said joining system comprises:
    an extension bracket (409) cantilever extending from said column (3) toward said rotatable apparatus (4);
    a guide slot (410) obtained in said extension bracket (409) and having a guiding direction; and
    an engaging member (420) of said guiding slot (410) that are integrally associated to said arm.

9. The device according to claim 1, wherein said connecting member comprises at least one stem (22) with one end (122) hinged to said column (3) and one opposing end (222) hinged to said joining system (12).

10. The device according to claim 1, wherein said working-tool (17) comprises a tire mounting portion (217) and an opposite tire demounting portion (117), said tire mounting portion having an elongated shape (30) with a tapered profile culminating in a vertex (31).

* * * * *